United States Patent
Qu

(10) Patent No.: US 7,761,101 B1
(45) Date of Patent: Jul. 20, 2010

(54) METHOD AND SYSTEM FOR ADJUSTING PROCESSING DURATION FOR MOBILE POSITION DETERMINATION

(75) Inventor: Jing Qu, Reston, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 821 days.

(21) Appl. No.: 11/708,197

(22) Filed: Feb. 20, 2007

(51) Int. Cl.
*H04W 24/00* (2009.01)

(52) U.S. Cl. .............. 455/456.2; 455/456.1; 455/456.3; 455/456.4; 455/456.5; 455/456.6; 455/457; 455/404.2

(58) Field of Classification Search ...... 455/456.1–457, 455/404.2
See application file for complete search history.

(56) References Cited

U.S. PATENT DOCUMENTS

| | | | | |
|---|---|---|---|---|
| 7,346,360 B1 * | 3/2008 | Mikan et al. | ............. | 455/456.1 |
| 2006/0009234 A1 * | 1/2006 | Freer | ........................ | 455/456.1 |
| 2008/0254810 A1 * | 10/2008 | Fok et al. | .................. | 455/456.2 |
| 2009/0325582 A1 * | 12/2009 | Jagadeesan et al. | ...... | 455/456.1 |

* cited by examiner

*Primary Examiner*—Huy Phan
*Assistant Examiner*—Justin Y Lee

(57) ABSTRACT

Disclosed is a method and system for adjusting processing time for responding to a request for location of a mobile station. A mobile location server or other position-determining system sends a location query to the mobile station and determines if the mobile station possesses a fresh set of assistance data usable by the mobile station to acquire satellite-based positioning data. If the determination is that the mobile possesses fresh assistance data, then the system waits a first time period for the mobile station to respond to the query, otherwise the system waits a second time period greater than the first time period for the mobile station to respond. If the mobile station responds in time, the system returns in response to the request a specific indication of the mobile station's location; otherwise, the system returns a general location, such as a cell sector location for instance.

21 Claims, 5 Drawing Sheets

CURRENT TIME: 3:00 PM CST 12/12/2006

| MOBILE STATION IDENTIFIER | ASSISTANCE DATA | TIME LAST RECEIVED ASSISTANCE DATA |
|---|---|---|
| MS_ID_1 | SATELLITES NEAR MS_ID_1 | 2:25 PM CST 12/12/2006 |
| MS_ID_2 | SATELLITES NEAR MS_ID_2 | 1:15 PM CST 12/12/2006 |
| ….. | ….. | ….. |

FIG. 5

METHOD AND SYSTEM FOR ADJUSTING PROCESSING DURATION FOR MOBILE POSITION DETERMINATION

FIELD OF THE INVENTION

The present invention relates to mobile position determining systems and, more particularly, to the processing time in such systems.

BACKGROUND

In the modern world, cellular wireless service is an increasingly popular means of personal communication. An important feature of contemporary cellular networks is an ability to locate the geographical position of a mobile station. Location technology is important for various reasons. For example, as many people carry their cellular phone on their person, the location of a mobile station (i.e., a cellular phone) can be used as a proxy for locating the person in possession of the phone. Accordingly, cellular location technology was initially developed to assist emergency services. In particular, E911 mobile location technology is used by law enforcement, rescue services, and others who are authorized to use it.

The availability of location information to support E911 services has given rise to the development of many other location-based services. For instance, given the location of a mobile station, a service provider (e.g., a wireless cellular carrier or third party) can provide the user of an mobile station (e.g., a cellular phone, PDA, or other type of device communicating via a cellular wireless communication network) with a weather or traffic report in the user's vicinity. As another example, a service provider can report a list of services or establishments (e.g., restaurants, parks, theatres, etc.) in the user's vicinity. As still another example, a service provider can provide a mobile station user with a map of the user's location or with directions for travel between the user's location and another location. And as yet another example, knowing that a mobile station is operating in a particular location, a location-based service provider can send the mobile station a location-based message, such as an advertisement or coupon for a nearby establishment. Other location-based services exist currently or will be developed in the future as well.

Many techniques can be used to locate a mobile station. For example, a radio access network may locate a mobile station by (i) using mobile satellite positioning data (e.g., a global positioning system (GPS)), (ii) using the round trip delay between a mobile station and a network entity to perform triangulation, and/or (iii) monitoring handoff messages. These techniques may be employed alone or in combination. Further, other techniques now known or later developed may also be employed alone or in combination with the above mentioned techniques.

In one common arrangement, a mobile station may be operable to provide its location to network entities using GPS. To facilitate a mobile station's use of GPS, a mobile location system (MLS) may inform the mobile station which satellites to tune to, by providing the mobile station with "assistance data" that is indicative of the appropriate satellites (e.g., the frequencies or other parameters that the mobile station should use to tune to the satellites). As mobile stations often relocate, the MLS may periodically update the mobile station with fresh assistance data.

When a mobile station does not possess fresh assistance data (that is, the mobile station either does not yet have assistance data or the mobile station has stale assistance data), the mobile station's processing time for a location request is greater. Specifically, the mobile station acquires the necessary assistance data and may further process that data in order to extract from it the relevant parameters, which assist the mobile station in tuning to the appropriate satellites. Furthermore, there may be instances where a mobile station is unable to obtain satellite-based positioning data, and therefore is unable to respond to a location request with its location. In particular, a mobile station may be unable to receive satellite communications if the mobile station is currently located in a position where its view of the sky is blocked, or if the mobile station's GPS receiver is not working, or in other circumstances.

Generally, situations where a mobile station is unable to respond to a location request can reduce the efficiency of the location-determination process. In this situation, when the mobile station will not return the requested data to the MLS, it would better for the MLS to know that fact and to simply resort to alternative location techniques. In addition, inefficiencies can be magnified in a situation where the MLS receives a request to determine the locations of a group of mobile stations, as may happen for instance when a fleet tracking application seeks to track the location of multiple mobile stations disposed in trucks. Accordingly, improvements are desirable.

SUMMARY

Exemplary methods are provided to account for the status of a mobile station's assistance data when responding to a location request. In particular, a timer may be set based on the status of the mobile station's assistance data. Then, if the timer expires before a mobile station responds with its location, a response to the location request with an alternative indication of the mobile station's location can be sent.

In general, an example method of adjusting processing duration for responding to a request for location of a mobile station includes: (a) making a determination of whether the mobile station possesses fresh assistance data usable by the mobile station to obtain satellite-based positioning data, (b) sending a location query to the mobile station and waiting for expiration of a timer for the mobile station to respond to the location query, wherein the timer is set to a first value if the determination is that the mobile station possesses the fresh assistance data, and the timer is set to a second value greater than the first value if the determination is that the mobile station does not possess fresh assistance data, (c) if the mobile station responds to the location query by expiration of the timer, then returning in response to the request a specific indication of the mobile station's location, and (d) if the mobile station does not respond to the location query by expiration of the timer, then returning in response to the request, a general indication of the mobile station's location. A specific indication may be based on satellite positioning data, which can be obtained using GPS, for example. A general indication may be the cell or sector of a mobile station, or may be the result of triangulation, for instance.

In another aspect, a method for adjusting processing duration for responding to a request for locations of a group of mobile stations may involve (a) making a determination of whether all of the mobile stations in the group possess fresh assistance data usable to obtain satellite-based positioning data, (b) sending location queries to the mobile stations, (c) if the determination is that all of the mobile stations in the group possess fresh assistance data, then waiting a first time period for the mobile stations to respond to the location queries, (d) if the determination is that, any of the mobile stations in the group does not possess fresh assistance data, then waiting a second time period greater than the first time period for the mobile stations to respond to the location queries, and (e) returning, in response to the request, a response that indicates the locations of the mobile stations in the group, wherein the response provides a general indication of location of each mobile station if any that did not provide a location query response in time, and wherein the response provides a specific indication of location of each mobile station if any that provided a location query response in time. Alternatively, a method for adjusting processing duration for responding to a request for locations of a group of mobile stations may involve, for each mobile station in the group, carrying out the above exemplary method.

In another aspect, the exemplary embodiment may take the form of a location-determination system that includes a location studio arranged to receive from a location based service application a request for the location of a mobile station, and a mobile location server arranged to receive from the location studio the request for the location of the mobile station and to responsively send a location query to the mobile station seeking from the mobile station a response providing either the mobile station's location or satellite-based positioning data received by the mobile station from a plurality of satellites.

In such a location-determination system, the mobile location system may additionally be arranged (a) to determine whether the mobile station possesses fresh assistance data usable by the mobile station to obtain satellite-based positioning data, (b) to wait for expiration of a timer for the mobile station to respond to the location query, wherein the timer is set to a first value if the determination is that the mobile station possesses the fresh assistance data, and the timer is set to a second value greater than the first value if the determination is that the mobile station does not possess fresh assistance data, (c) to return to the location studio in response to the request a specific indication of the mobile station's location if the mobile station responds to the location query by the expiration of the timer, and (d) to return to the location studio in response to the request a general indication of the mobile station's location if the mobile station does not respond to the location query by the expiration of the timer.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 5 is a chart depicting an example assistance data log.

DETAILED DESCRIPTION

1. Example Architecture

It should be understood that the arrangements and descriptions provided throughout this document are intended to be examples only and are not intended to be limiting. As such, those skilled in the art will appreciate that other arrangements and other elements and/or functions can be combined, distributed, eliminated, re-ordered, or otherwise modified from the arrangements shown and described.

Figure 1:
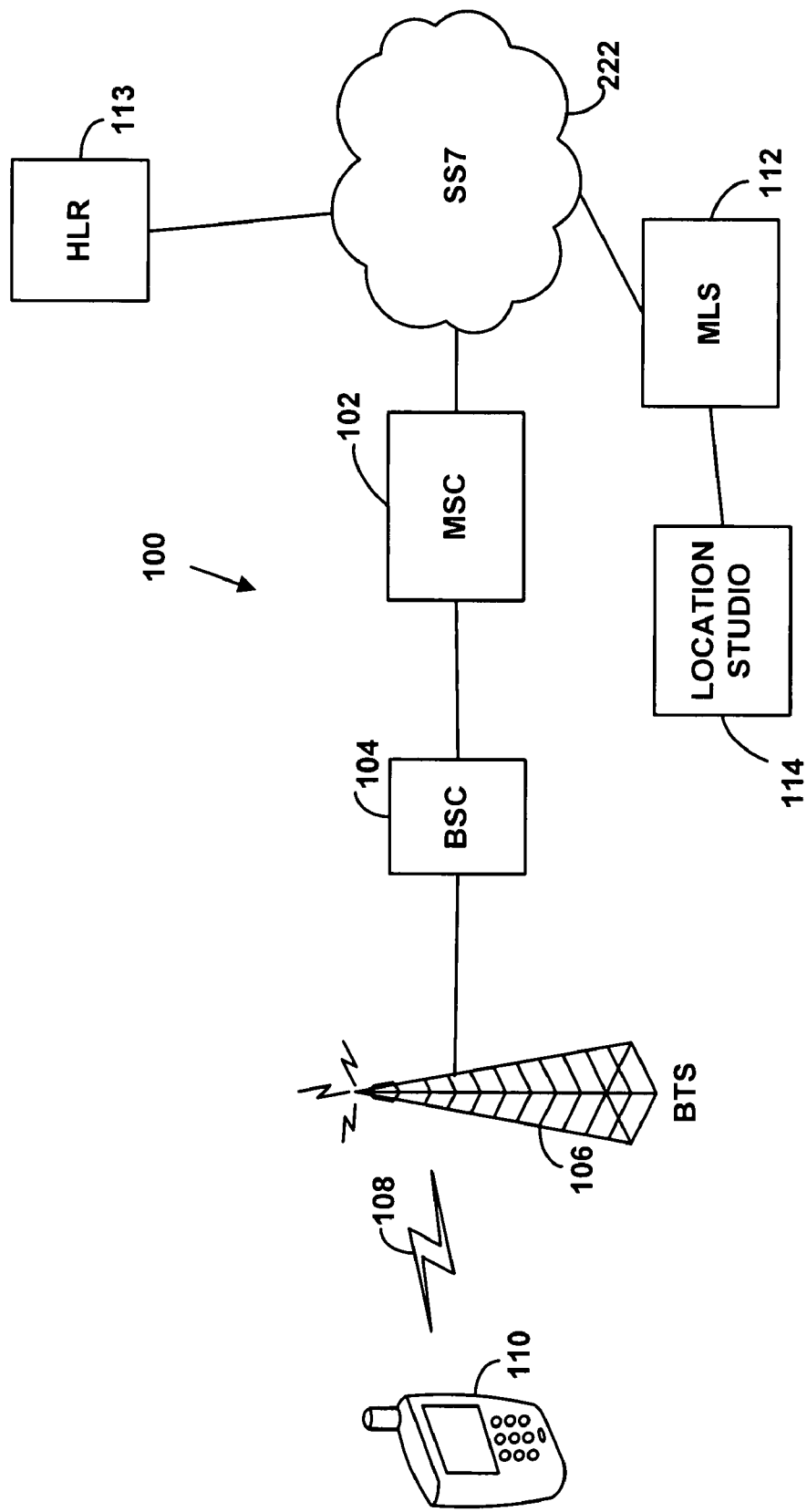
FIG. 1 is a simplified block diagram of a system arranged to operate in accordance with an exemplary embodiment of the invention.

To provide cellular wireless communication services, a wireless carrier typically operates a number of radio access networks, each of which is controlled by a switching entity. FIG. 1 is a block diagram depicting an example radio access network (RAN) 100, in which an exemplary embodiment can be employed. RAN 100 is controlled by a mobile switching center (MSC) 102. More specifically, MSC generally includes or connects with one or more base station controllers (BSCs) 104, which in turn connect with one or more base transceiver stations (BTSs) 106. Each BTS 106 conventionally includes a cell tower with one or more antennas that radiate to define an air interface 108 in which mobile stations can operate. With this arrangement, a mobile station 110 can communicate over air interface 108 and via BTS 106, BSC 104 and MSC 102, with entities on a transport network such as the public switched telephone network (PSTN) or the Internet.

In practice, when a location-based service (LBS) application 24 wants to determine the location of a mobile station, the application may send a location request message to the wireless carrier that serves the mobile station. In response, the carrier may then engage in a process to determine where the mobile station is currently located, and the carrier may then generate a response to the location request and send the response to the LBS application.

In a common arrangement, a wireless carrier operates a location determination system that determines and reports mobile station locations to requesting entities. In RAN 100, the location determination system includes a mobile location system (MLS) 112. In particular, MLS 112 is arranged to determine and report mobile station locations to requesting entities. To learn the position of a mobile station, MLS 112 can communicate with the mobile station itself and/or with various other entities such as the BSC and/or BTS currently serving the mobile station. RAN 100 may include a home location register (HLR) 113 that can provide the cell and/or sector of a mobile station (e.g., the BSC or BTS serving the mobile station).

RAN 100 may also include a front-end location studio (LST) 114, which serves as an interface between LBS applications and MLS 112. LST 114 functions to receive a location request from LBS applications, and to send corresponding location requests to MLS 112. MLS 112 operates to then determine the location of the mobile station and further, may operate to return the determined location of the mobile station to LST 114. Provided with the determined location, LST 114 can then return to the LBS application the determined location or data derived from the determined location (such as mapping, routing, or street address information, for instance).

A location request to MLS 112 (i.e., a request that is received directly, received via LST 114, or otherwise received), may seek either a general indication or a specific indication of location. Alternatively, the request may not specify the type of indication and MLS 112 or another entity may decide whether to provide a specific or general indication of location. A general indication of the mobile station's location may be an indication of the location of the cell/sector in which the mobile station is currently operating, such as the geographic location of a centroid of the cell/sector or a geographic location of the serving cell tower. As another example, the general indication could be a street address and/or the name of an establishment in which mobile station 22 is positioned. And as yet another example, a general indication may be derived using one of various triangulation techniques, such as advanced forward link trilateration (AFLT). Alternatively, the general indication of the mobile station's location could be a null or error value. A specific indication may be an indication of the geographic position of the mobile station itself. For example, a specific indication may be GPS coordinates, among others. In particular, the specific indication of the mobile station's location may comprise a location of the mobile station determined using assistance GPS (AGPS). A specific indication may take other forms as well. It should be understood that the terms "general indication" and "specific indication" are relative terms, described by way of example. Therefore, a general indication in one embodiment may be a specific indication in another embodiment or vice versa.

In the scenario where MLS 112 provides a general indication of location, the MLS may report the cell/sector that is currently serving a mobile station. To learn the cell/sector, the MLS may send a "low accuracy" location request to the RAN that is currently serving the mobile station, and the RAN may respond with an indication of the cell/sector in which the mobile station is currently operating. This communication may occur through a signaling network such as a Signaling System #7 (SS7) network 222 for instance, after home location register 213 informs MLS 112 which MSC is currently serving the mobile station. Alternatively, MLS 112 may cooperate with BTS 106, BSC 104, and/or MSC 102 to perform triangulation using various techniques now known or yet to be discovered.

To learn a more specific geographic position of the mobile station, MLS 114 may engage in communication with the mobile station itself, so as to obtain an indication of the mobile station's location based on satellite-based positioning data received by the mobile station. More particularly, in a "network assisted" location determination process, the MLS may ask the mobile station to report its location, and the mobile station may responsively compute its location using satellite-based positioning data and then return that determined location in a response to the MLS.

Alternatively, in a "mobile assisted" location-determination process, the MLS may ask the mobile station to provide satellite-based positioning data and, upon receipt of that data from the mobile station, the MLS may use the data to compute the mobile station's location. In either case, the communication between the MLS and the mobile station can occur in various ways, such as through a data session between MLS 114 and mobile station 110 (also known as "user plane" communication), or through control channel (e.g., SS7) signaling between the MLS 112 and mobile station 110 via SS7 network 222, MSC 102, BSC 104, and BTS 106 (also known as "control plane" communication).

In order for a mobile station to obtain satellite-based positioning information to facilitate either network assisted location determination or mobile assisted location determination, the mobile station must tune to each of multiple satellites and receive information transmitted respectively by each of those satellites. However, in order to do so, the mobile station first needs to learn which satellites it should tune to, namely, those satellites whose information can be used to best determine the mobile station's location. In practice, the MLS may inform the mobile station which satellites to tune to, by providing the mobile station with "assistance data" that is indicative of the satellites (e.g., the frequencies or other parameters that the mobile station should use to tune to the satellites). The MLS may determine (e.g., select) the appropriate set of assistance data to give the mobile station by correlating the mobile station's cell sector with well established data regarding which satellites cover that cell sector, for instance.

If a mobile station does not have fresh assistance data when the mobile station seeks to obtain satellite-based positioning data, the mobile station may ask the MLS to provide it with assistance data. The MLS may then provide the mobile station with the necessary assistance data, and the mobile station may then use that assistance data in order to tune to various satellites and obtain the necessary satellite-based positioning data. Alternatively, rather than having the mobile station request assistance data, the MLS could autonomously deliver assistance data to the mobile station when the MLS asks the mobile station to provide its location or to provide satellite-based positioning data. After a mobile station acquires assistance data from the MLS, the mobile station may use that assistance data to facilitate responding to location-determination requests until the mobile station then receives new assistance data.

Given the fact that a mobile station is unlikely to move substantial distances (compared with satellite-to-earth distance) in short periods of time, assistance data is assumed to remain applicable for some time period after it is sent to the mobile station. Therefore, a typical location system may be set to refresh the mobile station's assistance data only if a defined minimum period of time, such as 60 minutes for instance, has passed since the mobile station last received assistance data. During that period of time after the mobile station last received assistance data, the assistance data held by the mobile station is considered to be fresh and applicable. After that period of time expires, the assistance data held by the mobile station is then considered to be stale and inapplicable and should thus be replaced with fresh assistance data when the mobile station needs to obtain satellite-based positioning data.

This process of determining when to refresh, and then refreshing, the mobile station's assistance data can be controlled by the mobile station or by the MLS. For instance, in an arrangement where the mobile station asks the MLS for assistance data after receiving a request for location or for satellite-based positioning data, the mobile station can determine if it possesses fresh assistance data and, if not, may then ask the MLS for fresh assistance data. Alternatively, in an arrangement where the MLS autonomously provides assistance data to the mobile station, the MLS may determine if the mobile station possesses fresh assistance data (based on knowledge of when the MLS last provided assistance data to the mobile station, if at all). If the MLS thereby determines that the mobile station does not posses fresh assistance data, the MLS may deliver a set of applicable assistance data to the mobile station. On the other hand, if the MLS thereby determines that the mobile station possesses fresh assistance data, then the MLS need not deliver a set of assistance data to the mobile station.

As a general matter, if the MLS receives a request for a specific indication of location from an LBS application, the request may carry with it a processing time limit, which indicates how long the MLS can take to respond to the request. If the MLS can successfully determine the mobile station's location before the specified time limit expires, the MLS will thus return the determined location to the requesting entity. On the other hand, if the MLS cannot successfully determine the mobile station's location before the time limit expires, then the MLS will typically default to returning a lower-resolution version of the mobile station's location, such as an indication of the mobile station's cell/sector centroid (or an indication determined at some other intermediate level of granularity). Typically, the time limit may be selected to help assure that the mobile station has enough time to refresh assistance data, if need be.

When a mobile station has current assistance data (requiring no update), the amount of time, or at least an estimate of the amount of time to tune to the designated satellites, obtain the necessary satellite-based positioning data from the satellites, use that satellite-based positioning data to compute its location, and return the computed position to the MLS, can be determined. For example, it may generally take about 25 seconds for the MLS to receive from a mobile station a response to a location query, providing the mobile station's location. In an alternative embodiment where the MLS uses the satellite-based positioning data to compute location, the amount of time required for a mobile station to simply return the obtained satellite-based positioning data to the MLS, may also be determined.

When assistance data is updated, the process of acquiring and processing assistance data can extend the mobile station's processing time by a period on the order of 30 seconds (depending on the implementation). Modifying the previous example, it may take on the order of 25+30=55 seconds for the MLS to receive a response from the mobile station, rather than having it take just about 25 seconds for the MLS to receive a response from the mobile station when assistance data is current.

2. Exemplary Methods

Exemplary methods may be carried out or implemented in any entity or entities involved in locating a mobile station. However, the specification may, at times, describe exemplary methods by way of example with reference to a mobile location system (MLS) carrying out the method. This should not be construed to limit the scope of the invention. One skilled in the art will recognize that other entities, such as an MSC for instance, may carry out exemplary methods.

Figure 2:
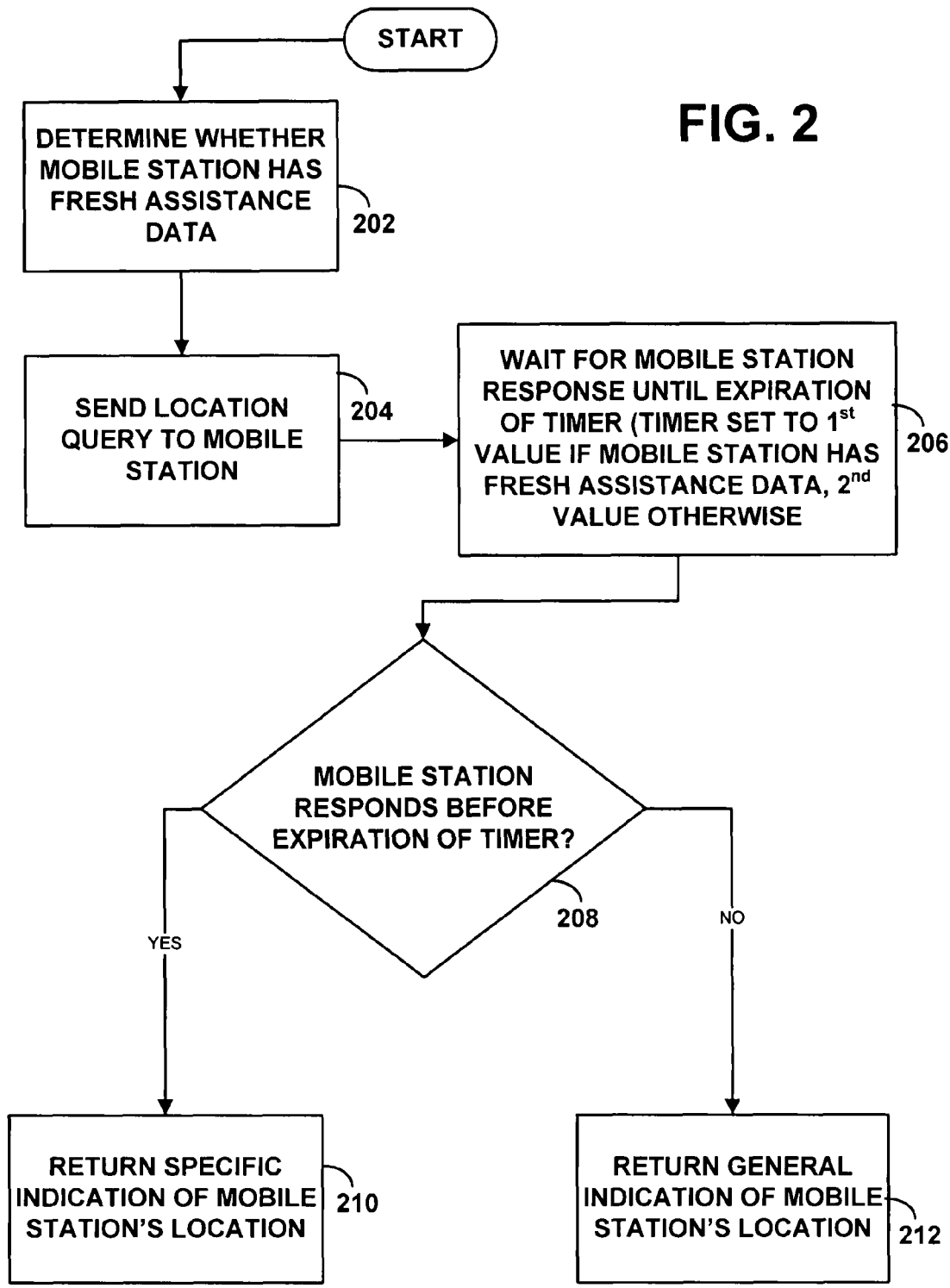
FIG. 2 is a simplified block diagram of an exemplary mobile location system.

FIG. 2 is a flow chart illustrating a method of adjusting processing duration for responding to a request for location of a mobile station. The exemplary method may be performed by an MLS in response to request for a mobile station's location. Such a request for a mobile station's location may be received from various sources. For example, an MLS may receive a location request from an LBS application or any other source capable of making a location request. By invoking an exemplary method, the MLS can then return an indication of location (specific or general) to the requesting application or entity.

The method includes determining whether the mobile station possesses fresh assistance data, which can be used by the mobile station to obtain satellite-based positioning data, as shown by block 202. The method further includes sending a location query to the mobile station and waiting for expiration of a timer for the mobile station to respond to the location query, as shown by block 206. Also shown by block 206, the timer is set to a first value if the mobile station possesses the fresh assistance data, and the timer is set to a second value greater than the first value if the determination is that the mobile station does not possess fresh assistance data.

The method also involves returning a specific or general indication of the mobile station's location, depending on whether a response is received from the mobile station before expiration of the timer, as indicated by decision block 208. In particular, if the mobile station responds to the location query by the expiration of the timer, the method involves returning a specific indication of the mobile station's location is returned, as shown by block 210. On the other hand, if the mobile station does not respond to the location query by expiration of the timer, the method involves returning a general indication of the mobile station's location.

An MLS or another entity may use various techniques to determine whether or not a mobile station has fresh assistance data. For example, the MLS can maintain an assistance data log for mobile stations it serves (or that could be served by the RAN). The assistance data log indicates the last time each mobile station received assistance data (if at all). The MLS can then reference the data log to determine if the mobile station possesses fresh assistance data. In particular, the MLS can access the last time the mobile station received assistance data (if at all) and compare the succeeding passage of time to a designated value indicating whether or not data is fresh (e.g., such as 60 minutes for instance).

Figure 3:
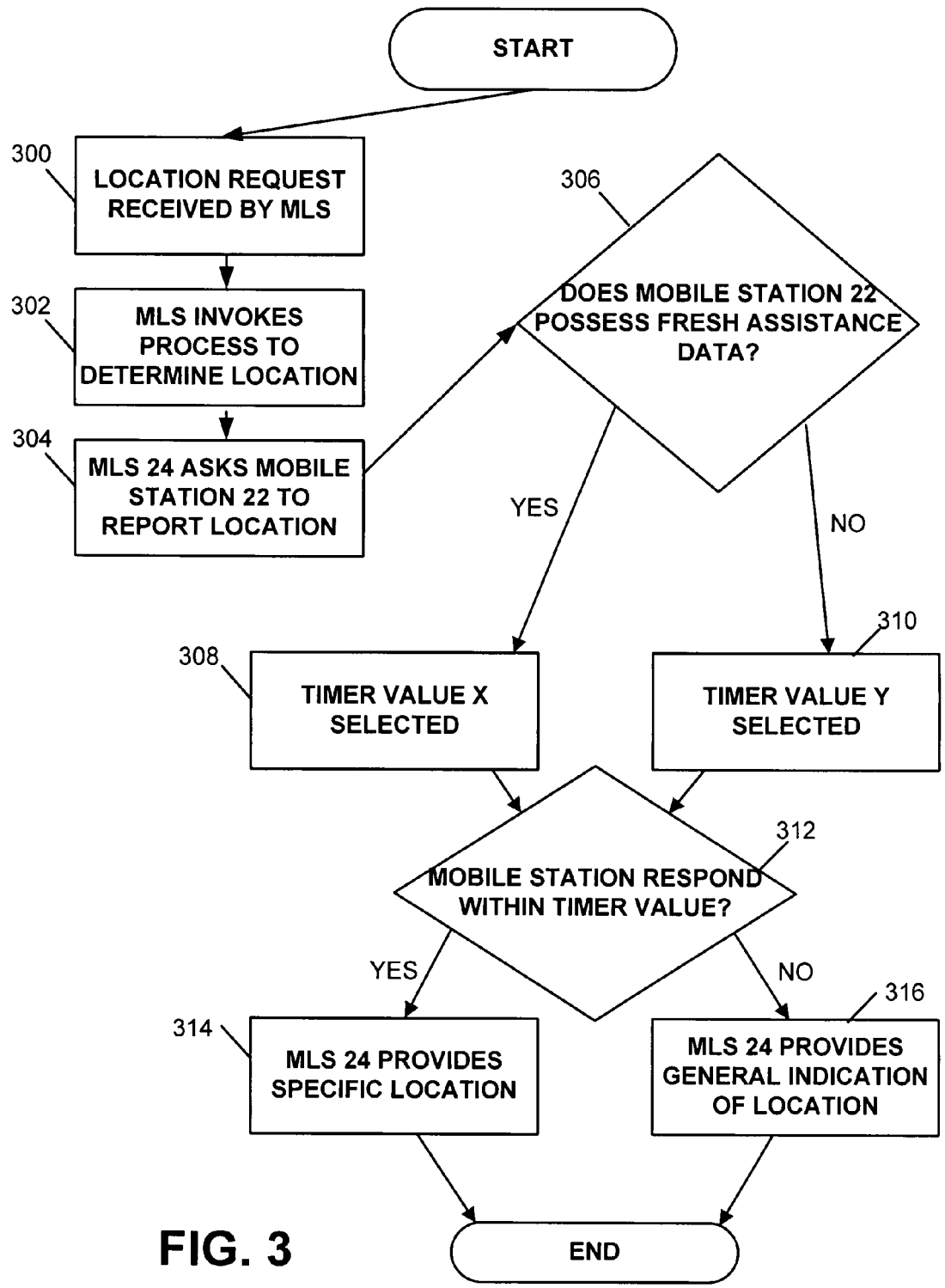
FIG. 3 is a diagram of an exemplary assistance data log.

FIG. 3 is a more detailed flow chart illustrating a method of adjusting processing duration for responding to a request for location of a mobile station. The method illustrated in FIG. 3 is similar to that illustrated in FIG. 2, but includes additional steps that involve selecting a value for the timer. The method illustrated by FIG. 3 is described as being carried out by an MLS, such as MLS 112, but other entities involved in location determination may also carry out the method.

As shown by block 300, an MLS receives a location request message from a requesting entity. The request may include a processing time limit to respond to the request and/or an identifier of the mobile station to be located. Then, at block 302, the MLS invokes a process to determine the mobile station's location. In particular, the MLS asks mobile station to report its location, as shown by block 304. In addition, the MLS determines whether mobile station possesses fresh assistance data, as shown by block 306. If the MLS determines that the mobile station possesses fresh assistance data, the MLS selects a timer value X for mobile station to respond to its location query, as shown by block 308. Preferably, timer value X is less than the processing time limit. At block 310, if the MLS determines that the mobile station does not possess fresh assistance data, the MLS selects a timer value Y for mobile station to respond to its location query. Preferably, timer value Y is greater than timer value X, yet is still less than the processing time limit.

At block 312, the MLS can determine whether the mobile station has responded by expiration of the selected timer value (e.g., X or Y). If the mobile station responds by expiration of the selected timer value, sending the MLS either the determined location or satellite positioning data, the MLS will give the requesting entity the specific location of the mobile station, as shown by block 314. Alternatively, if the mobile station does not respond by expiration of the selected timer value, the MLS will provide the requesting entity a general indication of the mobile station's location, as shown by block 316.

Advantageously, the method involves dynamically selecting a value for a timer based on the determination of whether or not the mobile station at issue possesses fresh assistance data. If the determination is that the mobile station possesses fresh assistance data, then the method may involve selecting for the internal timer a value that reflects the assumed time that it would take a mobile station that possesses fresh assistance data to respond to a location query. For instance, using the numbers set forth above, the method may involve setting the internal timer to 25 seconds. On the other hand, if the determination is that the mobile station does not possess fresh assistance data, then the method may involve selecting for the internal timer a value that reflects the assumed time that it would take a mobile station that does not possess fresh assistance data to respond to a location query. Thus using the numbers set forth above for instance, the method may involve setting the internal timer to 55 seconds. Other values and processes for selecting the first and second values of the timer are also possible. Further, in an alternative embodiment, more than two values for the timer may be created.

Since the value of the timer may vary, the waiting period, before defaulting to respond with a general indication of a mobile station's location, depends on whether or not the mobile station in question has fresh assistance data. In particular, if the determination is that the mobile station at issue possesses fresh assistance data, then the method involves waiting a first defined time period (e.g., time period X) for the mobile station to provide a response to a location query, and, if the mobile station does not respond by the expiration of that first defined time period, then defaulting to provide a general indication of the mobile station's location (or perhaps no indication of the mobile station's location). Whereas, if the determination is that the mobile station at issue does not possess fresh assistance data, then the method may involve waiting a second defined time period (e.g., time period Y) for the mobile station to provide a response before defaulting to respond with a general indication of the mobile station's location (or perhaps no indication of the mobile station's location). Preferably, the second time period (Y), which is selected when the mobile station does not have fresh assistance data, is greater than the first time period (X), which is selected when the mobile station has fresh assistance data.

In practice, the exemplary method can be used when responding to a request for the location of a single mobile station or when responding to a request for the locations of a group of mobile stations (i.e., a group location request). For example, the need for location of a group may arise when a fleet tracking application seeks to track the location of multiple mobile stations disposed in their fleet of trucks or delivery vehicles.

The application of an exemplary method to locate a group of vehicles may be particularly useful, as efficiency problems can be magnified in a situation where the MLS receives a request to determine the locations of a group of mobile stations. For example, when the MLS receives such a request, the MLS may independently seek to determine each mobile station's location through communication with each respective mobile station. Moreover, in some implementations, the MLS may wait to determine all of those mobile stations' locations before providing a response to the requesting entity. Thus, if even a single one of the mobile stations in such a group does not currently have a clear view of the sky, then the MLS will end up waiting until the full allowed time period expires before responding to the requesting entity. (At that point, the MLS may return the specific location of any mobile stations that the MLS could determine and the lower-resolution version of the location of any other mobile station in the group). Again, if the MLS knew that a mobile station lacked a clear view of the sky, the MLS could have simply defaulted to use the lower-resolution version of that mobile station's location, rather than dragging out the location-determination process, effectively waiting for nothing from that mobile station.

An MLS may respond to a request for the location of a group of mobile stations in various ways. For example, when responding to a group location request, the MLS can initially determine whether any of the mobile stations in the group does not possess fresh assistance data, similarly by referring to log data indicating for each mobile station the last time the mobile station received assistance data (if at all) and comparing the succeeding passage of time to a designated value such as 60 minutes for instance. If all of the mobile stations possess fresh assistance data, then the MLS may set the shorter internal timer generally for obtaining responses from the group of mobile stations. Whereas, if any of the mobile stations does not possess fresh assistance data, then the MLS may set the longer internal timer generally for obtaining responses from the group of mobile stations. In either case, once the internal timer expires, the MLS may then do any necessary computations and return the determined locations to the requesting entity (including returning the specific indication of location of any mobile station in the group that responded with to the MLS by expiration of the internal timer, and returning a general indication of location (of no indication of location) of any mobile station in the group that did not respond to the MLS by the expiration of the internal timer).

Alternatively, when responding to a group location request, the MLS may treat each mobile station individually in the manner described above for a single mobile station. For each mobile station, the MLS may thus set a respective internal timer with a value depending on whether the mobile station possesses fresh assistance data, and the MLS may thus obtain or determine a specific indication of the mobile station's location if the mobile station responds by expiration of the internal timer, or the MLS may obtain or determine a general indication (or a null or error value) of the mobile station's location if the mobile station does not respond by expiration of the internal timer. Once the MLS has thereby ascertained the location of each mobile station in the group, the MLS may return the ascertained locations to the requesting entity.

3. Exemplary Location Determination System

Figure 4:
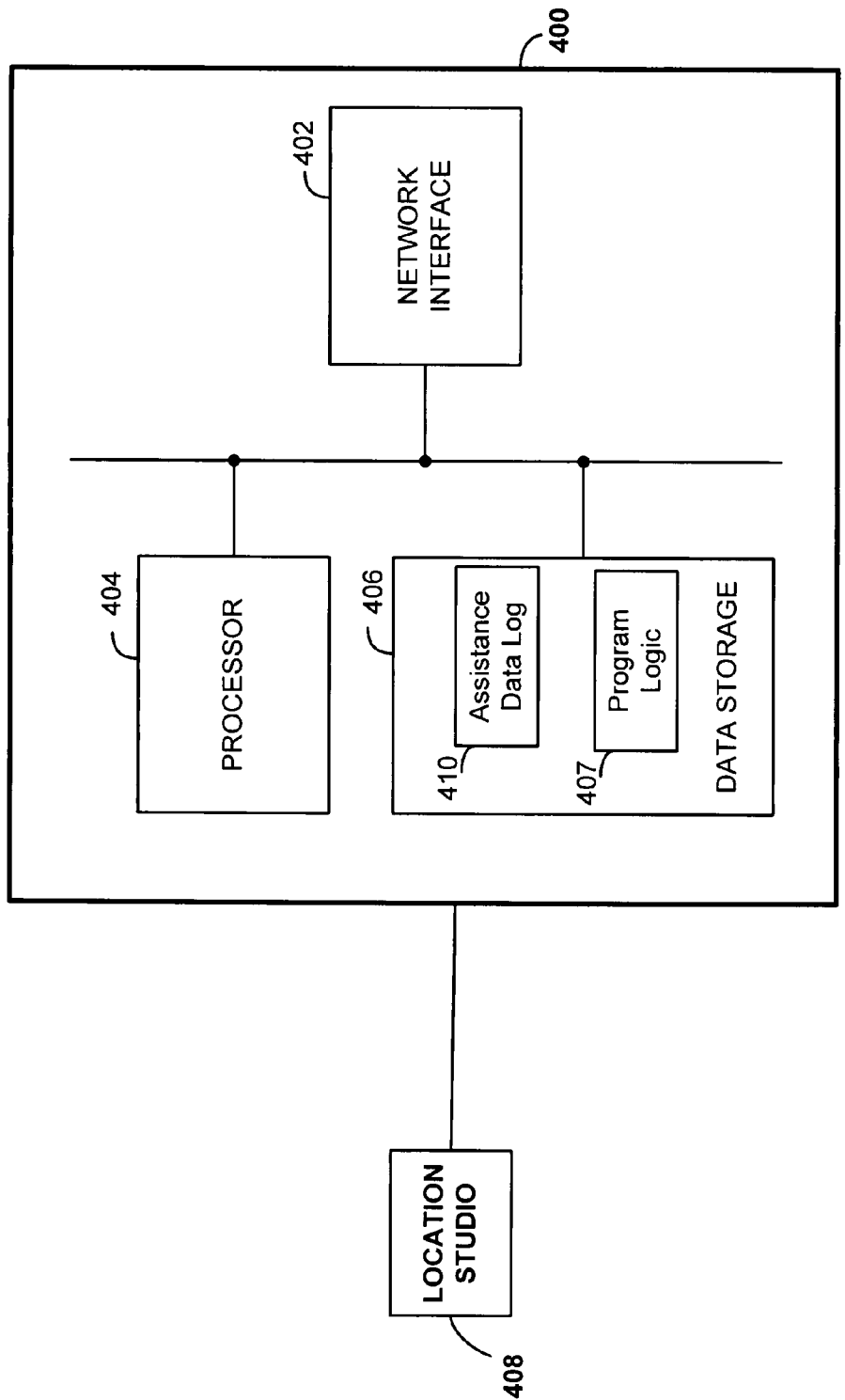
FIG. 4 is a flowchart depicting functions that can be carried out in accordance with the exemplary embodiment.

FIG. 4 is a simplified block diagram of a location determination system. The location determination system includes a mobile location system 400. Mobile location system 400 includes a network interface 402, a processor 404, and data storage 406. The location determination system may further include a location studio 408. The location studio may be arranged to receive from a location based service application a request for the location of a mobile station and forward the request to locating entity, such as an MLS. Accordingly, MLS 400 is arranged to receive from the location studio 408 a request for the location of the mobile station. Further, MLS 400 may be arranged to send a location query to the mobile station seeking from the mobile station a response providing either the mobile station's location or satellite-based positioning data received by the mobile station from a plurality of satellites.

Network interface 402 facilitates communications between mobile stations and MLS 400. Preferably, network interface 402 allows MLS 400 to communicate with mobile stations over a Signaling System #7 (SS7) network, although other configurations are also possible.

Processor 404 may comprise one or more general purpose processors (e.g., INTEL microprocessors) and/or one or more special-purpose processors (e.g., digital signal processors). Data storage 406 may comprise one or more volatile and/or non-volatile storage components, such as magnetic, optical, organic, or other storage mechanisms, and may be integrated in whole or in part with processor 404.

In an exemplary embodiment, data storage 406 holds program logic 407 that is executable by processor 404 to carry out various functions described herein. (Alternatively, the program logic may be embodied in firmware and/or hardware.) For example, the program logic may be executable (a) to determine whether the mobile station possesses fresh assistance data usable by the mobile station to obtain satellite-based positioning data, (b) to wait for expiration of a timer for the mobile station to respond to the location query, wherein the timer is set to a first value if the determination is that the mobile station possesses the fresh assistance data, and the timer is set to a second value greater than the first value if the determination is that the mobile station does not possess fresh assistance data, (c) to return to the location studio in response to the request a specific indication of the mobile station's location if the mobile station responds to the location query by the expiration of the timer, and (d) to return to the location studio in response to the request a general indication of the mobile station's location if the mobile station does not respond to the location query by the expiration of the timer. Further, the program logic may be executable to carry out any or all of (a)-(e) in order to respond to a request for locations of a group of mobile stations.

In another aspect, MLS 400 can maintain an assistance data log 410, which the MLS stores in data storage 406. MLS 400 operates to populate and maintain assistance data log 406 by regularly determining assistance data for each mobile station for which a location request may be received (i.e., all mobile stations to which a wireless carrier provides service). Preferably, the assistance data log 410 associates an identifier for each mobile station with the time at which the mobile station was last provided with assistance data. Thus, by maintaining assistance data log 410, MLS 400 can determine whether or not a particular mobile station has fresh assistance data. Alternatively or additionally, MLS 400 may determine whether or not a mobile station has fresh assistance data, based on requests for assistance data from the mobile station.

FIG. 5 shows an exemplary assistance data log. The data log includes three columns, indicating, from left to right, the mobile station identifier, assistance data for that particular mobile station, and the time when the mobile station last received the assistance data. In this example, the data log includes data for two mobile stations, identified by MS_ID_1 and MS_ID_2. The assistance data may include, among other information, the satellite or satellites from which each mobile station should retrieve its location.

An MLS can then refer to the assistance data log to determine whether a mobile station possesses fresh assistance data by comparing the last time the mobile station received assistance data with the succeeding passage of time. In particular, the passage of time between when the mobile station was last sent assistance data and the current time can be compared to a threshold time period to determine whether or not the assistance data is fresh. In this example, the mobile station identified by MS_ID_1 received assistance data 35 minutes ago, as it was sent assistance data at 2:25 PM and the current time is 3:00 PM. The mobile station identified by MS_ID_2 received assistance data 1 hour and 45 minutes ago, as it received assistance data at 1:15 PM. Therefore, if the threshold time period for fresh assistance data is 60 minutes, the mobile station identified by MS_ID_1 has fresh assistance data, while the mobile station identified by MS_ID_2 has stale assistance data.

5. Conclusion

Example embodiments of the present invention have been described above. Those skilled in the art will understand, however, that changes and modifications may be made to these embodiments without departing from the true scope and spirit of the invention, which is defined by the claims.

What is claimed is:

1. A method of adjusting processing duration for responding to a request for location of a mobile station, the method comprising:

making a determination of whether the mobile station possesses fresh assistance data usable by the mobile station to obtain satellite-based positioning data;

sending a location query to the mobile station and waiting for expiration of a timer for the mobile station to respond to the location query, wherein the timer is set to a first value if the determination is that the mobile station possesses the fresh assistance data, and the timer is set to a second value greater than the first value if the determination is that the mobile station does not possess fresh assistance data;

if the mobile station responds to the location query by expiration of the timer, then returning in response to the request a specific indication of the mobile station's location; and if the mobile station does not respond to the location query by expiration of the timer, then returning in response to the request a general indication of the mobile station's location.

2. The method of claim 1, further comprising:

setting the timer to the first value or the second value depending on the determination.

3. The method of claim 1, wherein the location query comprises a query for the mobile station to return the location of the mobile station.

4. The method of claim 1, wherein the location query comprises a query for the mobile station to return satellite-based positioning data that the mobile station will acquire from a plurality of satellites.

5. The method of claim 1, wherein the assistance data comprises data specifying a plurality of satellites from which the mobile station should obtain the satellite-based positioning data.

6. The method of claim 1, wherein making the determination of whether the mobile station possesses fresh assistance data comprises:

determining an amount of time that has passed since the mobile station last received assistance data, if any; and if the time meets a threshold condition, then making the determination that the mobile station possesses fresh assistance data; and if the time does not meet the threshold condition, then making the determination that the mobile station does not possess fresh assistance data.

7. The method of claim 6, further comprising maintaining in data storage a log indicating when the mobile station last received assistance data if any, wherein determining the amount of time that has passed since the mobile station last received assistance data if any comprises referring to the log.

8. The method of claim 1, further comprising receiving the request for location of the mobile station, the request carrying with it a response timer value indicating a maximum amount of time for responding to the request, wherein the response timer value is greater than both the first value and the second value.

9. The method of claim 1, wherein the specific indication of the mobile station's location comprises a location of the mobile station determined using assistance GPS (AGPS).

10. The method of claim 9, wherein the general indication of the mobile station's location comprises a location of the mobile station determined using a process selected from the group consisting of hybrid satellite-network fix, advanced forward link trilateration (AFLT), and cell sector location determination.

11. The method of claim 1, wherein the general indication comprises a null or error value.

12. A process for adjusting processing duration for responding to a request for locations of a group of mobile stations, the method comprising:

for each mobile station of the group, carrying out the method of claim 1.

13. The process of claim 12, further comprising:

returning, in response to the request, a response that indicates the locations of the mobile stations in the group, wherein the response provides the general indication of location of each mobile station for which a general indication of location was determined, if any, and the response provides the specific indication of location of each mobile station for which a specific indication of location was determined, if any.

14. A method of adjusting processing duration for responding to a request for locations of a group of mobile stations, the method comprising:

making a determination of whether all of the mobile stations in the group possess fresh assistance data usable to obtain satellite-based positioning data;

sending location queries to the mobile stations;

if the determination is that all of the mobile stations in the group possess fresh assistance data, then waiting a first time period for the mobile stations to respond to the location queries;

if the determination is that any of the mobile stations in the group does not possess fresh assistance data, then waiting a second time period greater than the first time period for the mobile stations to respond to the location queries; and returning, in response to the request, a response that indicates the locations of the mobile stations in the group, wherein the response provides a general indication of location of each mobile station if any that did not provide a location query response in time, and wherein the response provides a specific indication of location of each mobile station if any that provided a location query response in time.

15. The method of claim 14, wherein the location queries comprise a location query respectively to each mobile station, asking the mobile station to return the location of the mobile station.

16. The method of claim 14, wherein the location queries comprise a location query respectively to each mobile station, asking the mobile station to return satellite-based positioning data that the mobile station will acquire from a plurality of satellites.

17. The method of claim 14, wherein the assistance data comprises data specifying a plurality of satellites from which to obtain the satellite-based positioning data.

18. The method of claim 14, further comprising receiving the request for location of the mobile station, the request carrying with it a response time period indicating a maximum amount of time for responding to the request, wherein the response time period is greater than both the first time period and the second time period.

19. A location-determination system comprising:

a mobile location system arranged to receive a request for a location of a mobile station and to responsively send a location query to the mobile station seeking from the mobile station a response providing either the mobile station's location or satellite-based positioning data received by the mobile station from a plurality of satellites, wherein the mobile location system is further arranged (a) to determine whether the mobile station possesses fresh assistance data usable by the mobile station to obtain satellite-based positioning data, (b) to wait for expiration of a timer for the mobile station to respond to the location query, wherein the timer is set to a first value if the determination is that the mobile station possesses the fresh assistance data, and the timer is set to a second value greater than the first value if the determination is that the mobile station does not possess fresh assistance data, (c) to return a specific indication of the mobile station's location if the mobile station responds to the location query by the expiration of the timer, and (d) to return a general indication of the mobile station's location if the mobile station does not respond to the location query by the expiration of the timer.

20. The location-determination system of claim 19, further comprising a location studio arranged to receive from a location based service application a request for the location of a mobile station, wherein the mobile location system is arranged to receive the request for the location of the mobile station from the location studio.

21. The location-determination system of claim 20, wherein the request that the mobile location system receives from the location studio carries with it a response time period indicating a maximum amount of time for responding to the request, wherein the response time period is greater than both the first time period and the second time period.

* * * * *